United States Patent
Vegliante

(10) Patent No.: US 10,810,857 B1
(45) Date of Patent: Oct. 20, 2020

(54) SYSTEM AND METHOD FOR AUTOMATICALLY DETECTING UNAUTHORIZED ENTRY INTO A POOL

(71) Applicant: Paul Vegliante, Franklin Lakes, NJ (US)

(72) Inventor: Paul Vegliante, Franklin Lakes, NJ (US)

( * ) Notice: Subject to any disclaimer, the term of this patent is extended or adjusted under 35 U.S.C. 154(b) by 0 days.

(21) Appl. No.: 16/561,586

(22) Filed: Sep. 5, 2019

(51) Int. Cl.
| G08B 21/08 | (2006.01) |
| G01V 1/00 | (2006.01) |
| G08B 25/01 | (2006.01) |
| G08B 21/18 | (2006.01) |

(52) U.S. Cl.
CPC ........... *G08B 21/082* (2013.01); *G01V 1/001* (2013.01); *G08B 21/182* (2013.01); *G08B 25/016* (2013.01)

(58) Field of Classification Search
CPC .. G08B 21/082; G08B 21/182; G08B 25/016; G01V 1/001
See application file for complete search history.

(56) References Cited

U.S. PATENT DOCUMENTS

| 3,688,298 A * | 8/1972 | Miller | G08B 13/184 340/557 |
| 4,910,498 A * | 3/1990 | Feher | G08B 13/184 250/221 |
| 5,832,547 A | 11/1998 | Burroughs | |
| 6,130,615 A | 10/2000 | Poteet | |
| 6,259,365 B1 * | 7/2001 | Hagar | G08B 13/184 340/541 |
| 7,218,235 B1 * | 5/2007 | Rainey | G08B 21/086 340/521 |
| 7,578,596 B2 * | 8/2009 | Martin | E04H 4/0043 362/101 |
| 2011/0273291 A1 * | 11/2011 | Adams | G08B 13/183 340/552 |

FOREIGN PATENT DOCUMENTS

| FR | 2789787 A1 | 8/2000 |
| FR | 2884017 A1 | 10/2006 |
| WO | 2014/194921 A1 | 12/2014 |

\* cited by examiner

*Primary Examiner* — Sisay Yacob
(74) *Attorney, Agent, or Firm* — Hoffmann & Baron, LLP

(57) ABSTRACT

A system and method for automatically detecting unauthorized entry into a pool requiring no user involvement, and having a high degree of accuracy. The system comprises a plurality of light beam emitter devices and a plurality of light beam receiver devices positioned along an interior perimeter of the pool and a processor in communication with the plurality of light beam emitter devices and the plurality of light beam receiver devices. The plurality of light beam emitter devices emit a plurality of light beams and the plurality of light beam receiver devices receive a plurality of emitted light beams to form a grid extending across a the pool. Additionally, the processor monitors the grid, detects unauthorized entry into the pool based on an interruption of the grid, and generates and transmits an alarm message based on whether a level of the interruption of the grid exceeds a predetermined threshold.

7 Claims, 5 Drawing Sheets

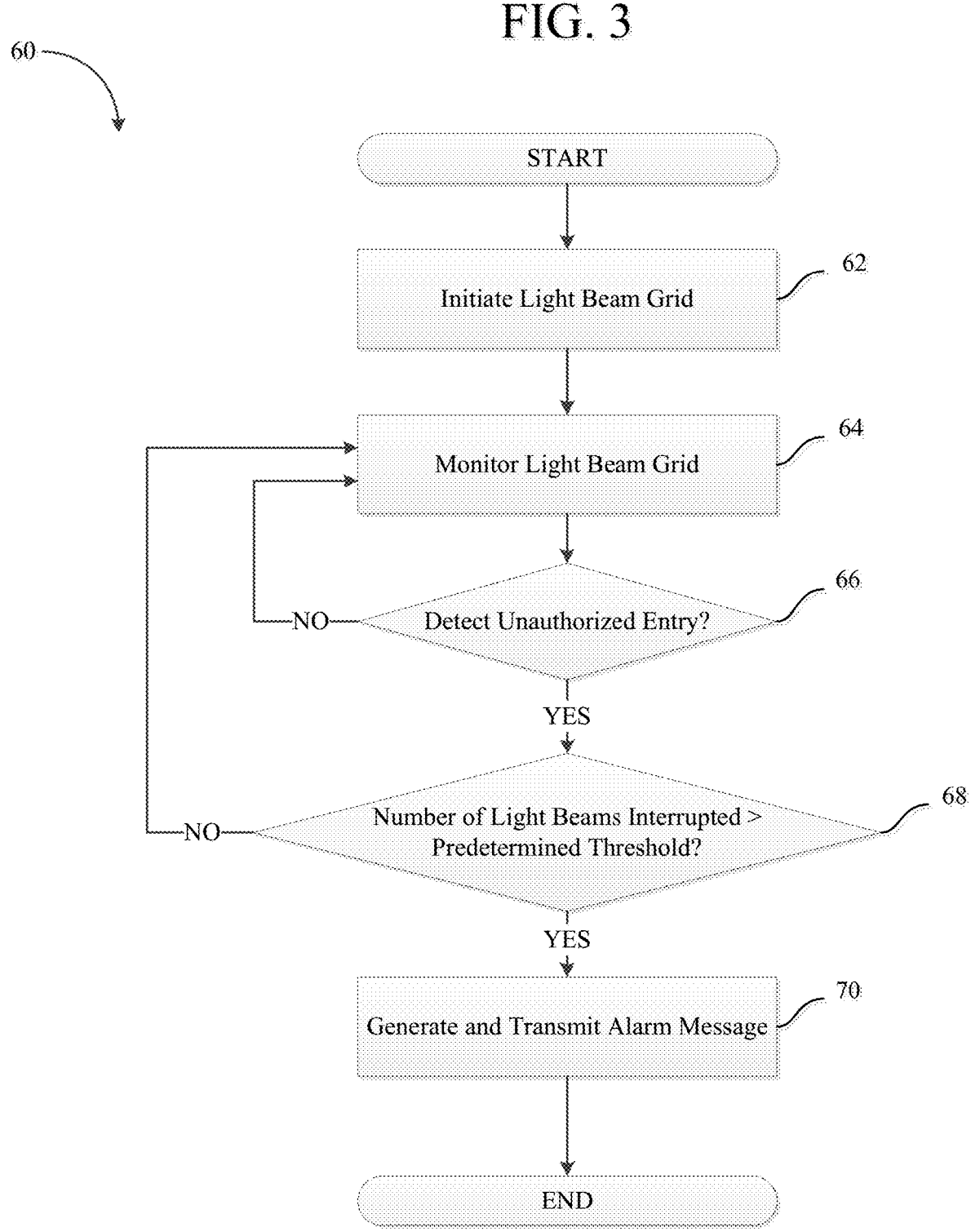

SYSTEM AND METHOD FOR AUTOMATICALLY DETECTING UNAUTHORIZED ENTRY INTO A POOL

BACKGROUND

Technical Field

The present disclosure relates generally to the field of pool safety systems. More specifically, the present disclosure relates to a system and method for automatically detecting unauthorized entry into a pool.

Related Art

Conventional pool safety systems can be unreliable because of a dependency on user monitoring and the frequent false detection of motion in a pool. Additionally, conventional systems generally use single bands. As such, there is currently an interest in the field of pool safety in developing a motion detecting pool safety system that automatically detects unauthorized entry into a pool requiring no user involvement, and having a high degree of accuracy.

SUMMARY

The present disclosure relates to a system and method for automatically detecting unauthorized entry into a pool requiring no user involvement, and having a high degree of accuracy. The system can, upon determining the detected unauthorized entry into the pool, automatically generate and transmit an alarm message to a remote device of a user and/or to a house alarm system.

The system comprises a plurality of light beam emitters, such as infrared light beam emitters, and a plurality of corresponding receivers, positioned along a perimeter of a pool, and a processor in communication with the plurality of emitter and receiver devices. The plurality of emitters and receivers form a grid extending over, on or below the water surface in a pool. The processor monitors the grid, detects unauthorized entry into the pool based on an interruption of one or more of the light beams forming the grid, and determines whether a level of the interruption of the grid exceeds a predetermined threshold. Thresholds can be set or adjusted by a user. The processor generates and transmits an alarm message to a remote device and/or a home alarm system when the level of the interruption of the grid exceeds the predetermined threshold.

BRIEF DESCRIPTION OF THE DRAWINGS

The features of the present disclosure will be apparent from the following Detailed Description, taken in connection with the accompanying drawings, in which:

FIG. 3 is a flowchart illustrating processing steps carried out by the system.

DETAILED DESCRIPTION

A system and method is disclosed for automatically detecting unauthorized entry into a pool requiring no user involvement, and having a high degree of accuracy, as described in detail below in connection with FIGS. 1-4.

Figure 1:
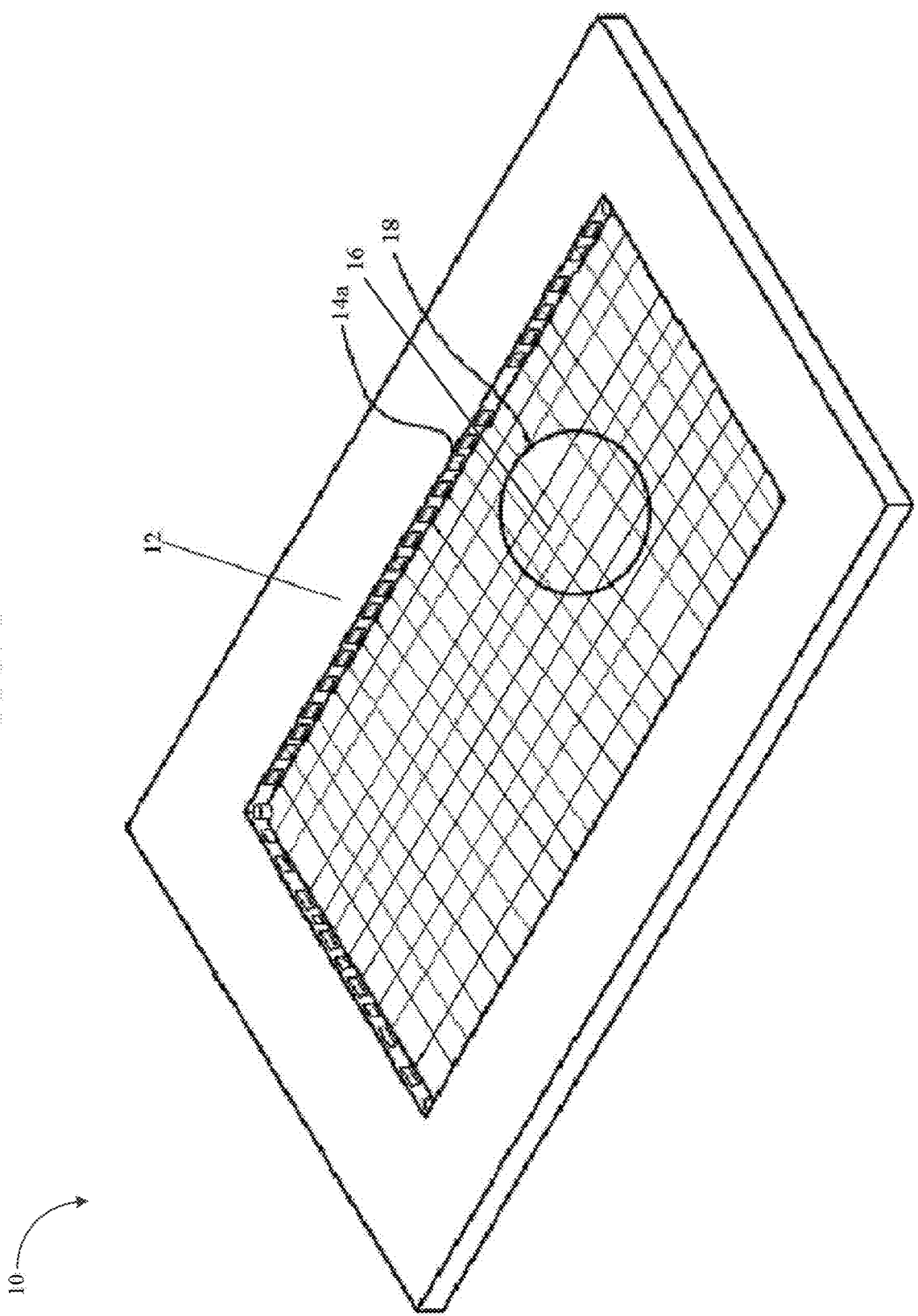
FIG. 1 is a diagram illustrating the system for automatically detecting unauthorized entry into a pool.

Turning to the drawings, FIG. 1 is a diagram illustrating the system 10. The system 10 comprises a plurality of emitters 14a and a corresponding plurality of receiving devices 14b. Each of the emitters 14a emits a light beam 16 such as an infrared light beam, and each of the corresponding receivers 14b receives a corresponding light beam 16 to form a grid 18 of light beam 16 extending across a pool 12. The emitter and receiver devices 14a, 14b could be positioned above or below a surface of the water (i.e., a waterline of the pool) along an interior perimeter of the pool 12. For example, the emitter and receiver devices 14a, 14b could be built into or attached to, a pool wall, pool coping or pool deck above or below the pool waterline. Any suitable light beam can be used, or any other type of point to point connection that can be interrupted by an object passing between the points, e.g. a laser, can be used for the detection system of the present disclosure.

The system 10 automatically detects unauthorized entry into the pool 12 when the system 10 detects an interruption of the grid 18 (e.g., an interruption of two or more adjacent light beams 16 forming the grid 18). If the system 10 determines that the number of interrupted light beams 16 exceeds a predetermined threshold, then the system 10 generates and transmits an alarm message to a remote device of a user (e.g., a pool owner) and/or a home alarm system. The remote device can include, but is not limited to, a personal computer, a laptop computer, a tablet computer and a smart telephone. The alarm message can notify the user of a potential drowning incident in the pool 12. Accordingly, the system 10 can automatically detect unauthorized entry into the pool 12 requiring no user involvement, and having a high degree of accuracy.

Thresholds level can be set and/or adjusted by the user. Threshold levels can corres to the number of light beams interrupted. The interruption of one light beam would provide for a very sensitive system, but could result in unwanted false alarms. For example, a sensitive system could suffer from false alarms from high winds, splashing water, small animals, insects, twigs or other debris, moths, birds, etc. A threshold requiring interruption of two or beams would significantly drop the chance of false alarms. Increasing the threshold too high could interfere with the functionality of sensor. Of course, the sensitivity depends on the spacing between adjacent light beams.

Figure 2A:
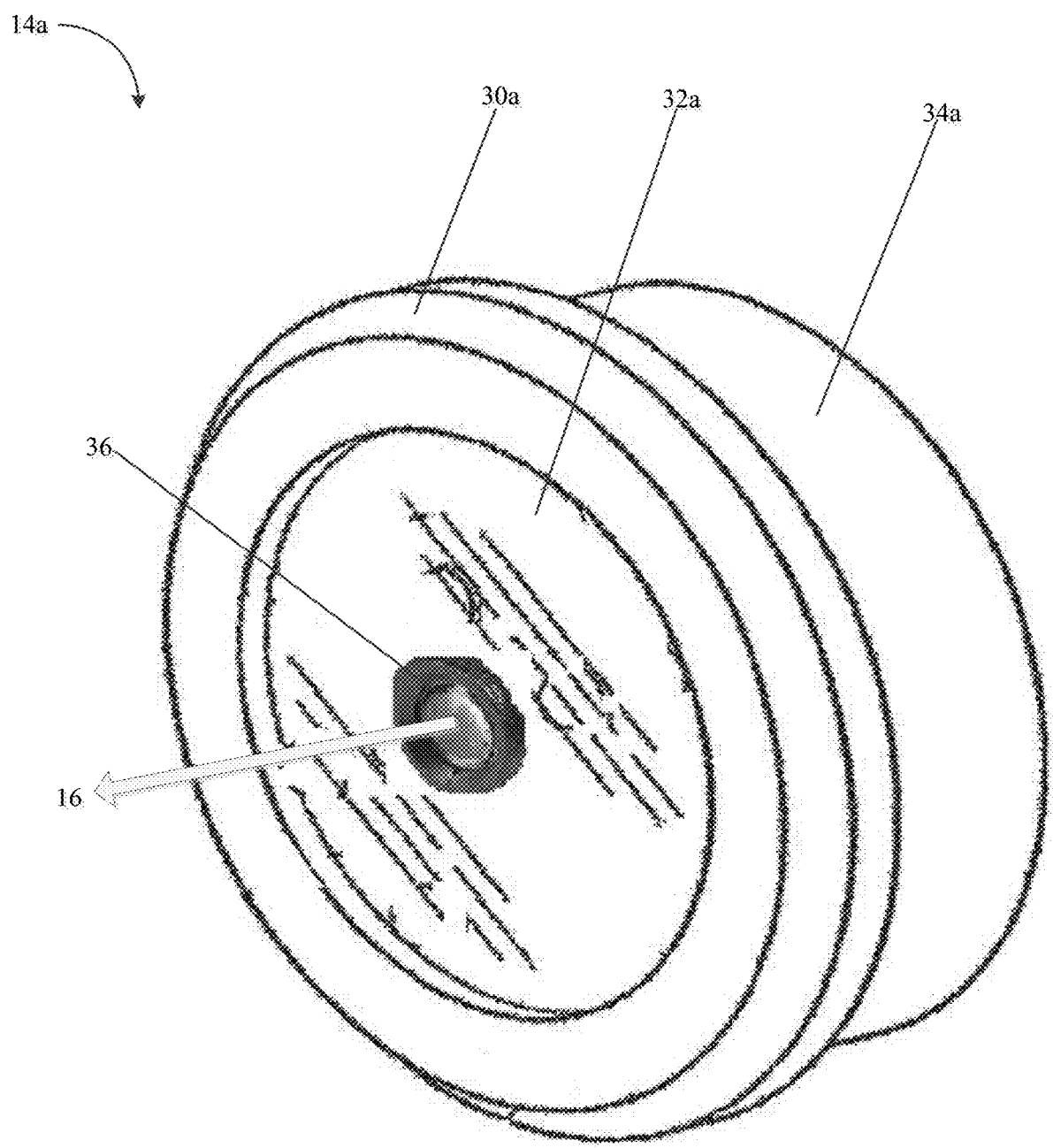
FIG. 2A-B are diagrams illustrating components of the system of FIG. 1.
Figure 2B:
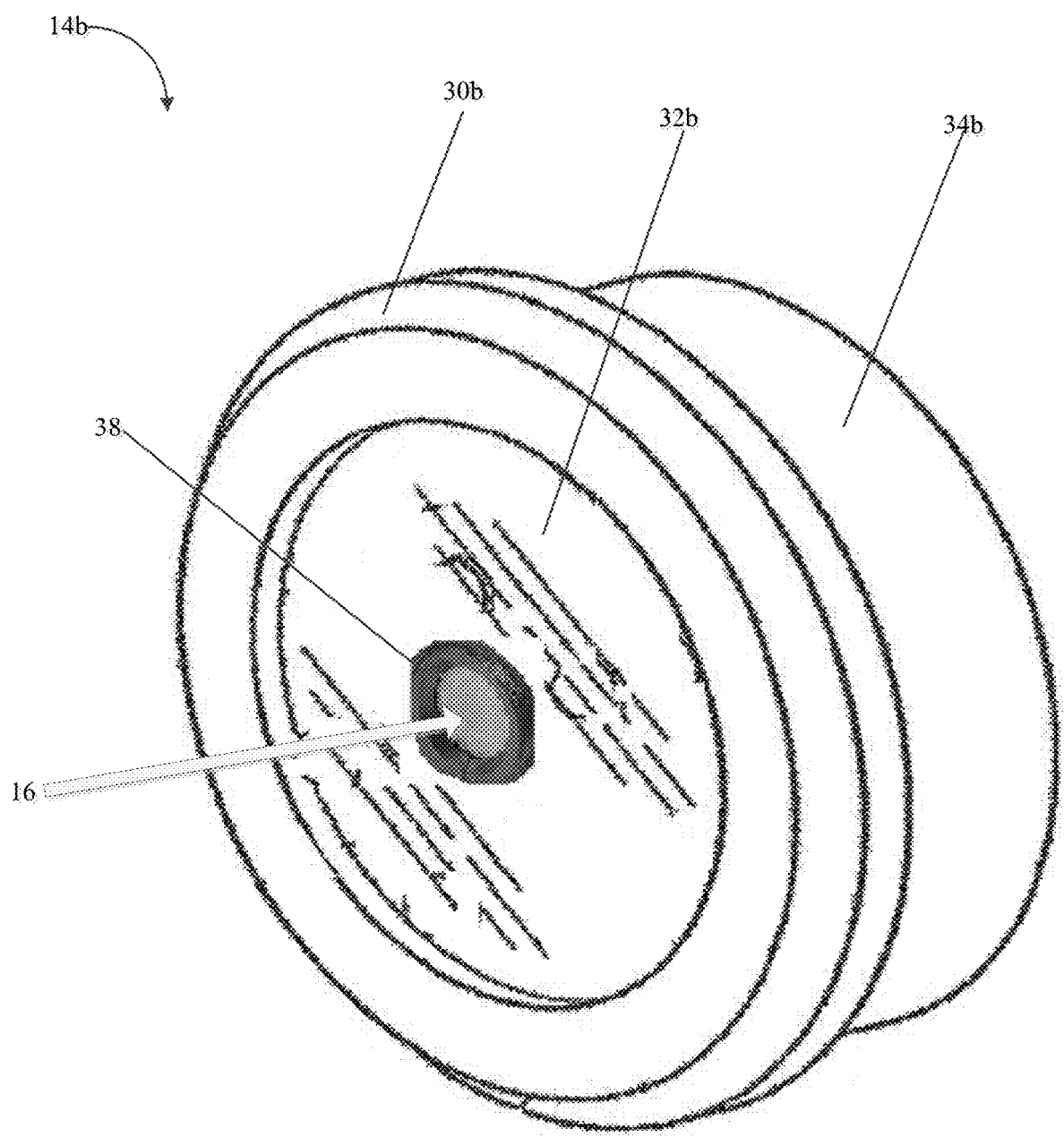

FIG. 2A is a diagram illustrating the emitter device 14a of the system 10 and FIG. 2B is a diagram illustrating the receiver device 14b of the system 10. The emitter and receiver devices 14a, 14b respectfully comprise a front housing 30a, 30b, a cover 32a, 32b, and a rear housing 34a, 34b. Additionally, the emitter device 14a comprises a light beam emitting portion 36 and the receiver device 14b comprises a light beam receiving portion 38.

The emitter and receiver devices 14a, 14b could include a cable attachment cord for supplying power to the emitter and receiver devices 14a, 14b. It should be noted that the emitter and receiver devices 14a, 14b could be any shape including, but not limited to, a rectangle, a square, a circle, a diamond, etc.

The rear housing 34a, 34b could be constructed of a thermally conductive and electrically insulative polymer material. Such a material could include, but is not limited to, electrically insulative and thermally conductive materials (e.g., plastic). In addition, the rear housing 34a, 34b could also be constructed of a chemical resistant material including, but not limited to, urethane, thermoplastic elastomer (TPE) overmolding, silicone or polyamide.

The front housing 30a, 30b could couple to the rear housing 34a, 34b via a plurality of mounting apertures and a plurality of screws (not shown) to form a watertight chamber between the front housing 30a, 30b and the rear housing 34a, 34b. It should be noted that the front housing 30a, 30b could be coupled to the rear housing 34a, 34b via any suitable means including, but not limited to, a plurality of tabs, an adhesive, tape, magents, sonic welding, etc. Still further, if the emitter and receiver devices 14a, 14b are a circular shape, then the front housing 30a, 30b could be coupled to the rear housing 34a, 34b by way of a watertight threaded connection, i.e., the front housing 30a, 30b could be threaded onto the rear housing 34a, 34b and vice versa. This connection could also be by any suitable means including, but not limited to, a plurality of tabs, an adhesive, tape, magents, sonic welding, etc. The front housing 30a, 30b could be constructed of a thermally conductive and electrically insulative polymer material. Such a material could include, but is not limited to, electrically insulative and thermally conductive materials (e.g., plastic).

The cover 32a, 32b could be formed using a suitable manufacturing process (e.g., injection molding, compression molding, thermoforming, etc.). The cover 32a, 32b could be formed from any suitable, electrically-insulating material, such as glass or a polymeric material (e.g., plastic). Such a material could include, but is not limited to, amorphous transparent copolymer having a cyclic olefin copolymer copolymerized from norbornene and ethylene using a metallocene catalyst and possessing properties important in optical components such as lenses. Such material possesses properties including, but not limited to, high transparency, low birefringence, high flowability for precision molding, high heat resistance and negligible water absorption.

Advantageously, the electrically non-conductive nature of the exterior components of the emitter and receiver devices 14a, 14b of the system 10 (i.e., the front housing 30a, 30b, the cover 32a, 32b, and the rear housing 34a, 34b) permit the emitter and receiver devices 14a, 14b to be installed in any location in a pool or spa. Further, since the exterior of the emitter and receiver devices 14a, 14b are electrically non-conductive, no specific bonding or grounding of the emitter and receiver devices 14a, 14b is necessary.

The emitting portion 36 can emit a light beam 16 and the receiving portion 38 can receive an emitted light beam 16 to form a grid 18 across the pool 12. The emitting portion 36 and the receiving portion 38 could be encapsulated in an optically transparent potting compound (not shown). The potting compound protects the emitting portion 36 and the receiving portion 38 from exposure to water in the event that the emitter and receiver devices 14a, 14b are no longer watertight, thereby protecting against electrical shock and promoting safety. The rear housing 34a, 34b could comprise the electronics (not shown) of the emitting portion 36 and the receiving portion 38. It is noted that the emitter and receiver devices 14a, 14b could be positioned on one of a pool wall, pool coping and pool decking along the interior perimeter of the pool 12.

FIG. 3 is a flowchart illustrating processing steps 60 carried out by the system 10 of FIG. 1. The system 10 provides for automatically detecting unauthorized entry into the pool 12 requiring no user involvement, and having a high degree of accuracy. Additionally, the system 10 can, upon determining the detected unauthorized entry into the pool 12, automatically generate and transmit an alarm message to a remote device and/or a home alarm system.

Beginning in step 62, the system 10 initiates the grid 18 by controlling the emitter and receiver devices 14a, 14b to emit and receive a plurality of light beams 16. Then, in step 64, the system 10 monitors the grid 18. In step 66, the system 10 determines whether unauthorized entry into the pool 12 has been detected. The system 10 automatically detects unauthorized entry into the pool 12 when the system 10 detects an interruption of the grid 18 (e.g., an interruption of at least one of the plurality of light beams 16 forming the grid 18). If the system 10 determines that unauthorized entry into the pool 12 has not been detected, then the system 10 returns to step 64 and monitors the grid 18. However, if the system 10 determines that unauthorized entry into the pool 12 has been detected, then the system 10 proceeds to step 68.

In step 68, the system 10 determines whether the detected interruption of the grid 18 exceeds a predetermined threshold. Specifically, the system 10 determines whether a number of interrupted light beams 16 (i.e., light beams 16 that are not received by their corresponding receiver devices 14) exceeds a predetermined threshold of interrupted light beams 16. If the system 10, determines that the number of interrupted light beams 16 does not exceed the predetermined threshold of interrupted light beams 16, then the system returns to step 64 and monitors the grid 18. However, if the system 10 determines that the number of interrupted light beams 16 exceeds the predetermined threshold of interrupted light beams 16, then the system 10 proceeds to step 70.

In step 70, the system 10 generates and transmits an alarm message to a remote device of a user (e.g., a pool owner) and/or to a home alarm system. The alarm message can notify the user of a potential drowning incident in the pool 12. Accordingly, the system 10 can automatically detect unauthorized entry into the pool 12 requiring no user involvement, and having a high degree of accuracy.

Figure 4:
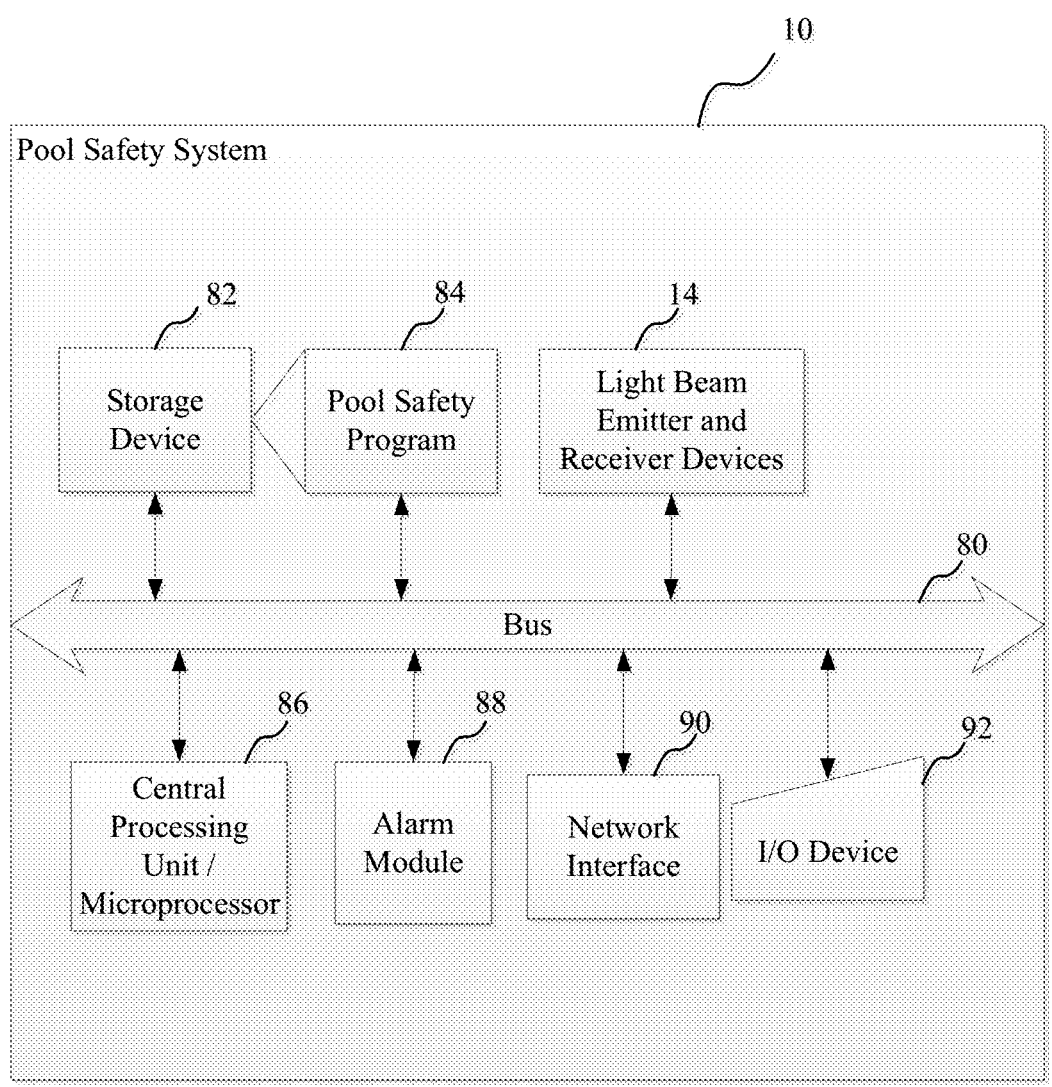
FIG. 4 is a diagram illustrating hardware and software components capable of being utilized to implement the system.

FIG. 4 is a diagram illustrating hardware and software components capable of being utilized to implement the system 10. The system 10 can include a communications bus 80, a storage device 82, pool safety code 84, a plurality of emitter and receiver devices 14a, 14b, a central processing unit (CPU) 86, an alarm module 88, a network interface 90 and one or more input devices 92 including, but not limited to, a keyboard, a mouse, etc.

The storage device 82 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.).

The functionality provided by the system 10 of the present disclosure could be provided by the pool safety program 84, which could be embodied as computer-readable program code stored on the storage device 82 and executed by the CPU 86 using any suitable, high or low level computing language, such as Python, Java, C, C++, C #, .NET, MATLAB, etc. Accordingly, execution of the pool safety program 84 is configured to control operation of the plurality of emitter and receiver devices 14a, 14b and the alarm module 88. The alarm module 88 generates and an alarm message that can be transmitted to one or more of a remote device of the user, a home alarm system and a monitoring station.

The network interface 90 could include an Ethernet network interface device, a wireless network interface device, or any other suitable device which permits the system 10 to communicate via a network to a remote device of the user including, but not limited to, a personal computer, a server, a smart phone, tablet computer etc. The CPU 86 could include any suitable single-core or multiple-core microprocessor of any suitable architecture that is capable of implementing and running the pool safety program 84 (e.g., Intel processor).

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected is set forth in the following claims.

The invention claimed is:

1. A system for automatically detecting unauthorized entry into a pool, comprising:
   a plurality of light beam emitter devices positioned along an interior perimeter of a pool;
   a plurality of light beam receiver devices positioned along the interior perimeter of the pool facing the plurality of light beam emitter devices; and
   a processor in communication with the plurality of light beam emitter devices and the plurality of light beam receiver devices, the processor:
      controlling the plurality of light beam emitter devices to emit a plurality of light beams and controlling the plurality of light beam receiver devices to receive a plurality of emitted light beams to form a grid extending across a surface of the pool;
      monitoring the grid;
      detecting unauthorized entry into the pool based on an interruption of the grid;
      determining whether a level of the interruption of the grid exceeds a predetermined threshold, the predetermined threshold defining a number of interrupted light beams; and
      if the level of the interruption of the grid exceeds the predetermined threshold, generating and transmitting an alarm message to a remote device of a user.

2. The system of claim 1, wherein the processor detects the unauthorized entry into the pool based on an interruption of the grid when at least two of the plurality of emitted light beams forming the grid are interrupted such that the at least two of the plurality of emitted light beams are not received by their corresponding receiver devices.

3. The system of claim 1, wherein the plurality of light beam emitter devices emit a plurality of infrared light beams and the plurality of receiver devices receive a plurality of emitted infrared light beams.

4. The system of claim 1, wherein the plurality of light beam emitter devices and the plurality of light beam receiver devices are constructed of a thermally conductive and electrically insulative polymer material.

5. A method for automatically detecting unauthorized entry into a pool, comprising the steps of: controlling a plurality of light beam emitter devices to emit a plurality of light beams and controlling a plurality of light beam receiver devices to receive a plurality of emitted light beams;
   forming a grid of light beams extending across a surface of the pool, the plurality of light beam emitter devices being positioned along an interior perimeter of a pool and the plurality of light beam receiver devices being positioned along the interior perimeter of the pool facing the plurality of light beam emitter devices;
   monitoring the lights beams of the grid;
   detecting unauthorized entry into the pool based on an interruption of the light beams of the grid;
   determining a level of the interruption of the light beams of the grid exceeds a predetermined threshold when a number of interrupted light beams of the grid exceeds a predetermined threshold, the predetermined threshold defining a number of interrupted light beams;
   generating and transmitting an alarm message to at least one of a remote device, a home alarm system and a monitoring station when the number of interrupted light beams of the grid exceeds the predetermined threshold; and
   generating an audible alarm via a speaker proximate to the pool when the number of interrupted light beams of the grid exceeds the predetermined threshold.

6. The method of claim 5, further comprising detecting the unauthorized entry into the pool based on an interruption of the light beams of the grid when at least two light beams of the grid are interrupted such that the at least two light beams of the grid are not received by their corresponding receiver devices.

7. The method of claim 5, wherein the plurality of light beam emitter devices emit a plurality of infrared light beams and the plurality of receiver receive a plurality of emitted infrared light beams.

* * * * *